United States Patent
Alberts et al.

(10) Patent No.: US 12,215,671 B2
(45) Date of Patent: Feb. 4, 2025

(54) POWER BOOST FOR A WIND TURBINE

(71) Applicant: Siemens Gamesa Renewable Energy A/S, Brande (DK)

(72) Inventors: Johannes Gerhardes Wardjan Alberts, Brøndby Strand (DK); Bjarne Skovmose Kallesøe, Bagsværd (DK)

(73) Assignee: Siemens Gamesa Renewable Energy A/S, Brande (DK)

( * ) Notice: Subject to any disclaimer, the term of this patent is extended or adjusted under 35 U.S.C. 154(b) by 84 days.

(21) Appl. No.: 17/641,141

(22) PCT Filed: Jul. 22, 2020

(86) PCT No.: PCT/EP2020/070682
§ 371 (c)(1),
(2) Date: Mar. 8, 2022

(87) PCT Pub. No.: WO2021/052655
PCT Pub. Date: Mar. 25, 2021

(65) Prior Publication Data
US 2022/0282701 A1 Sep. 8, 2022

(30) Foreign Application Priority Data
Sep. 16, 2019 (EP) .................................... 19197508

(51) Int. Cl.
*F03D 7/02* (2006.01)
(52) U.S. Cl.
CPC .......... *F03D 7/028* (2013.01); *F03D 7/0224* (2013.01); *F05B 2270/1033* (2013.01);
(Continued)

(58) Field of Classification Search
CPC .... F03D 7/028; F03D 7/0224; F05B 2270/10; F05B 2270/32; F05B 2270/328; F05B 2270/335
See application file for complete search history.

(56) References Cited

U.S. PATENT DOCUMENTS

2014/0248123 A1* 9/2014 Turner .................. F03D 7/0292
415/15
2017/0248123 A1* 8/2017 Hales ...................... F03D 9/257
(Continued)

FOREIGN PATENT DOCUMENTS

| EP | 2868918 A1 | 5/2016 |
|---|---|---|
| WO | 2014048583 A1 | 4/2014 |
| WO | 2016058617 A1 | 4/2016 |

OTHER PUBLICATIONS

PCT International Search Report and Written Opinion of International Searching Authority mailed Nov. 10, 2020 corresponding to PCT International Application No. PCT/EP2020/070682 filed Jul. 22, 2020.

(Continued)

*Primary Examiner* — Sean Gugger
(74) *Attorney, Agent, or Firm* — Schmeiser, Olsen & Watts, LLP

(57) ABSTRACT

A method of controlling a wind turbine includes the step of boosting the output power of the wind turbine above the nominal power of the wind turbine, according to a boost operational function representing a boost level for the wind turbine. The boost operational function is a crescent function of an operational variable at least between a first threshold value and a second threshold value of the operational variable.

5 Claims, 2 Drawing Sheets

(52) U.S. Cl.
CPC ..... *F05B 2270/32* (2013.01); *F05B 2270/328* (2013.01); *F05B 2270/335* (2013.01)

(56) References Cited

U.S. PATENT DOCUMENTS

| | | |
|---|---|---|
| 2017/0356420 A1 | 12/2017 | Hales et al. |
| 2018/0045180 A1* | 2/2018 | Beekmann ................ F03D 9/25 |
| 2018/0156197 A1 | 6/2018 | Spruce |

OTHER PUBLICATIONS

Merriam Webster; "Crescent", URL: <https://www.merriam-webster.com/dictionary/crescent> Last Updated Nov. 1, 2023. Date Accessed: Nov. 8, 2023. 11 pages.

Dictionary.com, "Crescent", Random House, Inc. 2023. URL: <https://www.dictionary.com/browse/crescent> Date Accessed: Nov. 8, 2023. 4 Pages.

* cited by examiner

POWER BOOST FOR A WIND TURBINE

CROSS-REFERENCE TO RELATED APPLICATIONS

This application claims priority to PCT Application No. PCT/EP2020/070682, having a filing date of Jul. 22, 2020, which claims priority to EP Application No. 19197508.5, having a filing date of Sep. 16, 2019, the entire contents both of which are hereby incorporated by reference.

FIELD OF TECHNOLOGY

The following relates to the control of a wind turbine for power boosting or increasing of the operative power above the nominal power of the wind turbine.

BACKGROUND

Wind turbines may provide power boost, i.e., the possibility to increase power over the nominal power value. The rotational speed is increased together with the power. Boost is configurable and may be set as default to a 5% of the nominal power. If the generator and converter capacity allow for it, the power boost can be increased to a higher number, for example 10% of the nominal power. This overcapacity may be for example used to boost power at high winds.

According to a possible known implementation the bower boost is a step increase in power production when the pitch angle and the wind speed has reached above a predefined threshold. This is done to make sure that the power is not boosted at rated winds, where most extreme loads drive component design. By first boosting not at rated winds but just above where the loads have already lowered, the extreme loads will not be increased above their design levels by the additional speed and power production. The discrete jump in the power output determines two main problems:

if the boost percentage changes, the pitch angle where boost is applied must be adapted as well. For example, if a power boost of 5% may be enabled at 6 degrees away from optimum pitch, a boost of 10% may only by applied at a pitch angle 12 degrees away from optimum pitch. By delaying the boost threshold, a lot of power is lost;

when the boost is applied, the turbine blades pitch slightly into the wind to balance the increase in extracted electrical power to the extracted wind power. This extra pitch travel is not necessary and due to the high loading, it adds a lot to the cumulative structural damage in wind turbine components, such as the pitch bearings.

SUMMARY

An aspect relates to provide a control method and circuit for controlling a wind turbine, in order to optimize the boosted power, resulting in an increased annual energy production (AEP), independently of wind distributions and without exceeding extreme structural capacity of blades, tower and other structural wind turbine components.

According to a first aspect of embodiments of the present invention a method of controlling a wind turbine is provided, which comprises the step of boosting the output power of the wind turbine above the nominal power of the wind turbine, according to a boost operational function representing a boost level for the wind turbine, the boost operational function being a crescent function of an operational variable at least between a first threshold value and a second threshold value of the operational variable.

According to a second aspect of embodiments of the present invention, a controller for a wind turbine is provided, which includes a boosting circuit for boosting the output power of the wind turbine above the nominal power of the wind turbine, according to a boost operational function representing a boost level for the wind turbine. The boost operational function is a crescent function of an operational variable at least between a first threshold value and a second threshold value of the operational variable, the boosting circuit receiving as input:

an enabling criteria command,
a desired pitch angle, and
a desired power reference, the boosting circuit producing as output:

a pitch reference, and
a boosted power reference representing the boost level for the wind turbine.

In the context of embodiments of the present invention, a "boosting circuit" can be implemented as a hardware circuit and/or a programmable logic circuit configured and arranged for implementing the specified operations/activities. In possible embodiments, a programmable circuit may include one or more computer circuits programmed to execute a set (or sets) of instructions (and/or configuration data). The instructions (and/or configuration data) can be in the form of firmware or software stored in and accessible from a memory. The "boosting circuit" may be part of the controller of the wind turbine.

According to embodiments of the present invention, the boost operational function is a linear function of the operational variable at least between a first threshold value and a second threshold value. The boost operational function may be constant between the second threshold value and a third threshold value of the operational variable. The boost operational function may be decrescent between the third threshold value and a fourth threshold value of the operational variable.

According to embodiments of the present invention, between the first threshold value and the second threshold value of the wind speed, the boost operational function is defined at constant pitch. Keeping constant the pitch angle when speed and power are boosted lowers the pitch bearing damage.

Alternatively, the boost operational function is defined at crescent pitch angle ranging between the first threshold value and the second threshold value.

According to another embodiment of the present invention, the pitch angle is kept constant between the first threshold value and the second threshold value and increased, for example linearly, between the second threshold value and the third threshold value, i.e., the dynamic boost increases the power by keeping the pitch angle constant until the maximum power output is achieved and, when the maximum is achieved, then the blades pitch out further if winds increase. This keeps the power and speed constant, thereby following the wind.

Advantageously, by providing a dynamic boost instead of the discrete boost of the prior art, embodiments of the present invention permit to significantly increase the AEP.

BRIEF DESCRIPTION

Some of the embodiments will be described in detail, with reference to the following figures, wherein like designations denote like members, wherein.

DETAILED DESCRIPTION

Figure 1:
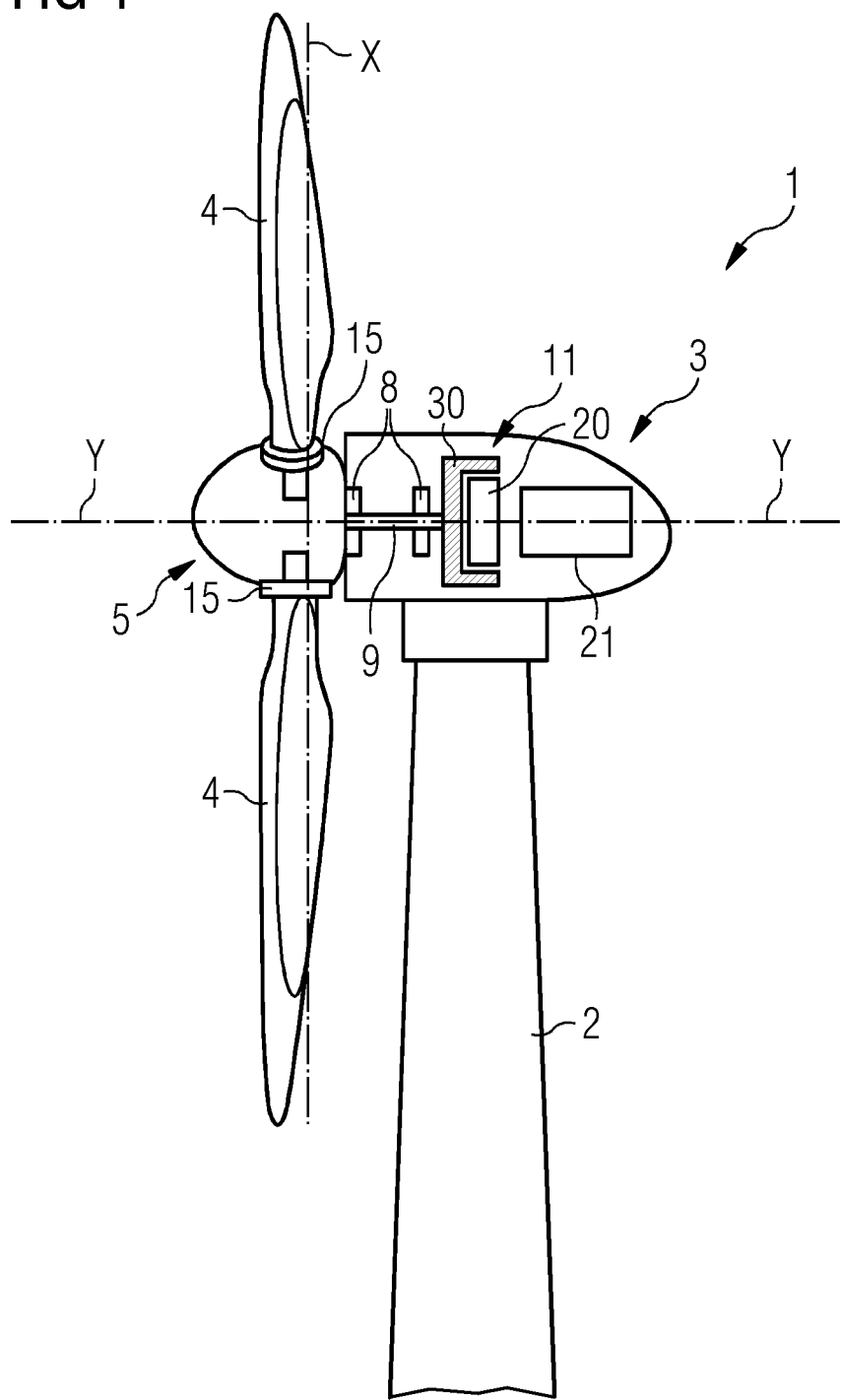
FIG. 1 shows a schematic section of a wind turbine to which the control method and circuit of an embodiment of the present invention can be applied for controlling power boost.

The illustrations in the drawings are schematic. It is noted that in different figures, similar or identical elements are provided with the same reference signs.

FIG. 1 shows a wind turbine 1 according to embodiments of the invention. The wind turbine 1 comprises a tower 2, which is mounted on a non-depicted foundation. A nacelle 3 is arranged on top of the tower 2. The wind turbine 1 further comprises a wind rotor 5 having at least one blade 4 (in the embodiment of FIG. 1, the wind rotor comprises three blades 4, of which only two blades 4 are visible). The wind rotor 5 is rotatable around a rotational axis Y. The blades 4 extend substantially radially with respect to the rotational axis Y and along a respective longitudinal axis X.

The wind turbine 1 comprises an electric generator 11, including a stator 20 and a rotor 30. The rotor 30 is rotatable with respect to the stator 20 about the rotational axis Y. The wind rotor 5 is rotationally coupled with the electric generator 11 either directly, e.g., direct drive or by means of a rotatable main shaft 9 and/or through a gear box (not shown in FIG. 1). A schematically depicted bearing assembly 8 is provided in order to hold in place the main shaft 9 and the rotor 5. The rotatable main shaft 9 extends along the rotational axis Y.

The wind rotor 5 comprises three flanges 15 for connecting a respective blade 4 to the wind rotor 5. A pitch bearing is interposed between each blade flange 15 and the respective blade 4. A hydraulic pitch actuation circuit is associated to the pitch bearings of the blades 4 for regulating the pitch angle of each blade, i.e., the angular position of each blade about the respective blade longitudinal axis X. The hydraulic pitch actuation circuit may adjust all pitch angles on all rotor blades 4 at the same time and/or individual pitching of the rotor blades 4 may be available. On a rear side rear side of the nacelle 3, opposite to the wind rotor 5, a converter 21 is provided. The transformer 21 is electrical connected to the electrical generator 11 to transform the electrical output of the generator 11 to a certain predetermined power output at a predetermined voltage level to be provided to an electrical network, which is electrically connected to the transformer 21.

The wind turbine 1 comprises a controller (not shown) with a processor and a memory. The processor executes computing tasks based on instructions stored in the memory. According to such tasks, the wind turbine in operation generates a requested power output level. In particular, the power output level may be a boost power, i.e., having a value greater than a nominal output power Pw of the wind turbine 1. This may be obtained by adjusting the pitch angle by operating accordingly the hydraulic pitch actuation circuit associated to the pitch bearings of the blades 4. Alternatively, the requested power output level may be obtained by adjusting the power output of the converter 21.

Figure 2:
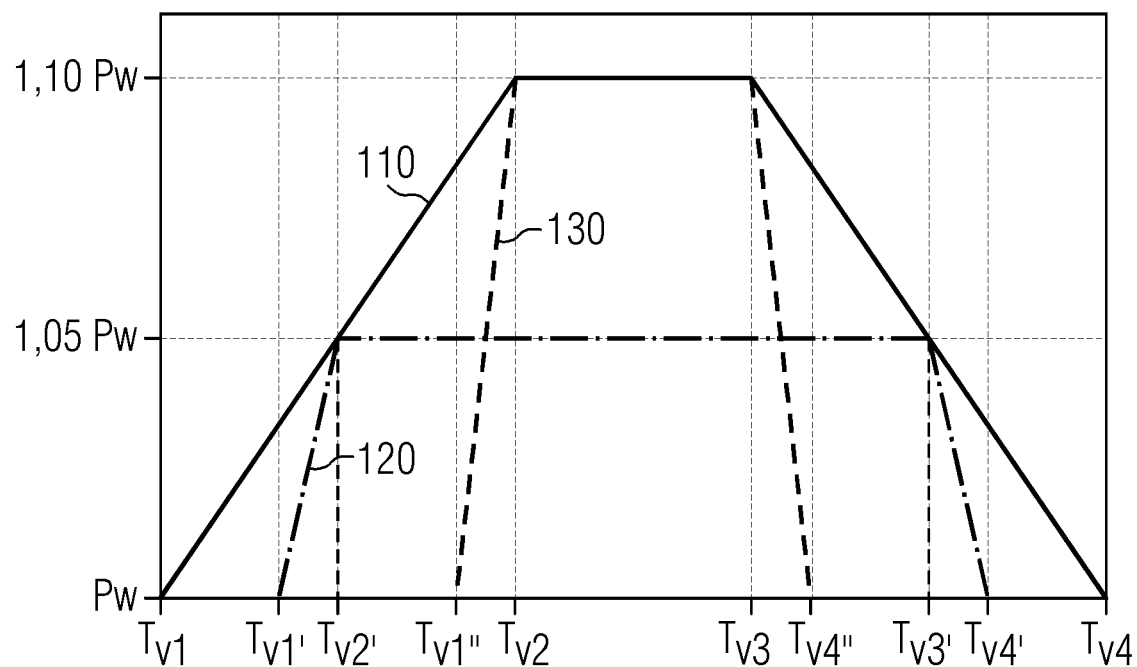
FIG. 2 shows a graph illustrating showing how power boost according to an embodiment of the present invention is operated.

FIG. 2 shows three boost operational functions 110, 120, 130, which may be generated by the controller for operating the wind turbine 1 above nominal output power Pw. The three boost operational functions 110, 120, 130 are shown on a cartesian graph having an abscissa axis representing values of an operational variable and an ordinate axis representing values of output power (as a percentage of the nominal power output Pw of the wind turbine 1). The operational variable may be different according to the different embodiments of the present invention, as better clarified in the following.

According to a first embodiment of the invention, a boost power is generated according to a first boost operational function 110. The first boost operational function 110 is a crescent function of the operational variable between a first threshold Tv1 value and a second threshold value Tv2 of the operational variable. The operational variable is a wind speed, which may be a measured or an estimated value of the wind speed. In particular, the first boost operational function 110 is a crescent linear function of the wind speed. At the second threshold value Tv2 the power output reaches a predefined power boost level, which may be exceeding the nominal power Pw of a 10% (power output is 110% of the nominal power Pw). The first boost operational function 110 is a constant function of the wind speed between the second threshold Tv2 value and a third threshold value Tv3 of the wind speed and a decrescent function of the wind speed between the third threshold Tv3 value and a fourth threshold value Tv4 of the wind speed. In particular, the boost operational function 110 is a decrescent linear function of the wind speed between the third threshold Tv3 value and the fourth threshold value Tv4. The first boost operational function 110 is obtained at a constant pitch, by adjusting only the power output of the converter 21 according to a wind speed—dependent look-up table. According to another embodiment of the present invention, the first boost operational function 110 may be obtained at a variable pitch.

According to other embodiments of the present invention, the operational variable may be a turbulence intensity or a pitch angle.

According to a second embodiment of the invention, a boost power is generated according to a second boost operational function 120. The second boost operational function 120 is a crescent function of a pitch angle between a first threshold Tv1' value and a second threshold value Tv2' of the pitch angle. In particular, the second boost operational function 120 is a crescent linear function of the pitch angle. At the second threshold value Tv2' the power output reaches a predefined power boost level, which may be exceeding the nominal power Pw of a 5% (power output is 105% of the nominal power Pw). The second boost operational function 120 is a constant function of the pitch angle between the second threshold Tv2' value and a third threshold value Tv3' of the pitch angle and a decrescent function of the pitch angle between the third threshold Tv3' value and a fourth threshold value Tv4' of the pitch angle. In particular, the second boost operational function 120 is a decrescent linear function of the pitch angle between the third threshold Tv3' value and the fourth threshold value Tv4'. The second boost operational function 120 is obtained at variable pitch, by operating accordingly the hydraulic pitch actuation circuit to generate a predefined pitch ranging between a pitch minimum, at the first threshold Tv1', and a pitch maximum, at the second threshold Tv2'.

According to a third embodiment of the invention, a boost power is generated according to a third boost operational function 130. The third boost operational function 130 is a crescent function of a pitch angle between a first threshold Tv1'' value and a second threshold value Tv2 of the pitch angle. In particular, the third boost operational function 130 is a crescent linear function of the pitch angle. At the second threshold value Tv2 the power output reaches a predefined power boost level, which may be exceeding the nominal power Pw of a 10% (power output is 110% of the nominal power Pw). The third boost operational function 130 is a constant function of the pitch angle between the second threshold Tv2 value and a third threshold value Tv3 of the pitch angle and a decrescent function of the pitch angle between the third threshold Tv3 value and a fourth threshold value Tv4' of the pitch angle. In particular, the third boost operational function 130 is a decrescent linear function of the pitch angle between the third threshold Tv3 value and the fourth threshold value Tv4'. Similarly to the second boost operational function 120, the third boost operational function 130 is obtained at variable pitch, by operating accordingly the hydraulic pitch actuation circuit to generate a predefined pitch ranging between a pitch minimum, at the first threshold Tv1", and a pitch maximum, at the second threshold Tv2.

The first threshold Tv1, Tv1', Tv1" is chosen sufficiently high to not start boosting at a peak thrust where highest extreme loads and most fatigue loads occur.

Figure 3:
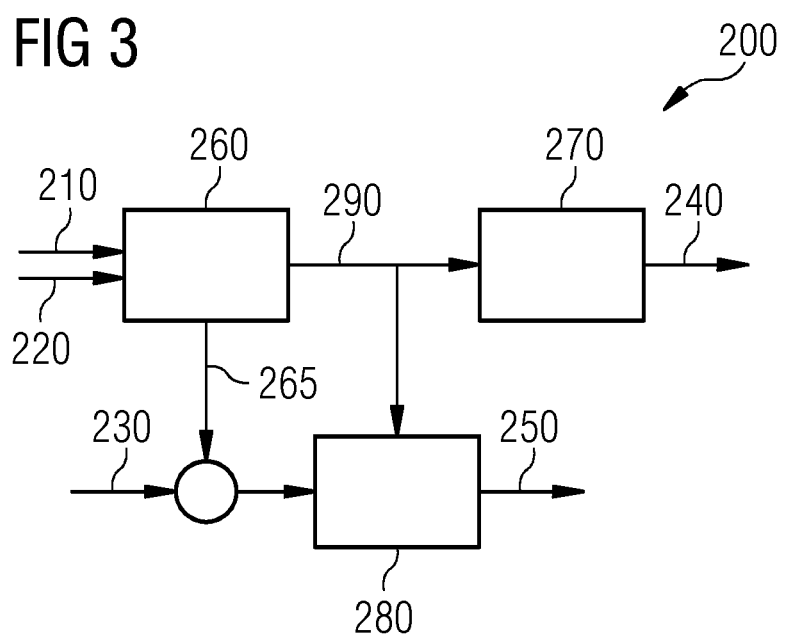
FIG. 3 shows a schematic diagram representing a circuit for controlling power boost according to an embodiment of the present invention.

The second and the third boost operational functions 120, 130 may be obtained through a boosting circuit 200, represented in FIG. 3. The boosting circuit 200 can be implemented as a hardware circuit and/or a programmable logic circuit configured and arranged for implementing the specified operations/activities. The boosting circuit 200 may be included in the controller of the wind turbine 1. The boosting circuit 200 receives as input an enabling criteria command 210 (for example depending from the wind speed, so that the wind speed during boost operations is chosen sufficiently high to not start boosting at a peak thrust where highest extreme loads and most fatigue loads occur), a desired pitch angle 220 and a desired power reference 230. The boosting circuit 200 generates as output a pitch reference 240 and a boosted power reference 250. The boosting circuit 200 comprises a dynamic power boost block 260 which receives as input the enabling criteria command 210 and the desired pitch angle 220 and generates as output a dynamic power boost signal 265, which represents the percentage of desired boost, and boosted speed reference signal 290. The boosting circuit 200 comprises a speed-pitch controller 270 which receives as input the boosted speed reference signal 290 and generates as output the pitch reference 240. The boosting circuit 200 further comprises a speed-power controller 280 which receives as input a sum of the desired power reference 230 and the dynamic power boost signal 265 and generates as output the boosted power reference 250. The outputs of the boosting circuit 200 are then an increased power reference sent to the converter 21 and a pitch angle that accounts for the increase in desired speed which is sent to the hydraulic pitch actuation circuit.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method of controlling a wind turbine, the method comprising:
    boosting an output power of the wind turbine above a nominal power of the wind turbine, according to a boost operational function representing a boost level for the wind turbine, the boost operational function being a crescent linear function of a turbulence intensity at least between a first threshold value and a second threshold value of the turbulence intensity, wherein the boost operational function is defined at a constant pitch angle of at least one blade between the first threshold value and the second threshold value.

2. The method according to claim 1, wherein the boost operational function is constant between the second threshold value and a third threshold value of the turbulence intensity.

3. The method according to claim 1, wherein the boost operational function is linearly decrescent between a third threshold value and a fourth threshold value of the turbulence intensity variable.

4. The method according to claim 1, wherein the pitch angle is increased between the second threshold value and a third threshold value.

5. The method according to claim 1, wherein the first boost operational function is obtained at the constant pitch angle by adjusting the output power according to a look-up table.

* * * * *